(12) United States Patent
Liotta et al.

(10) Patent No.: US 8,425,194 B2
(45) Date of Patent: Apr. 23, 2013

(54) CLAMPED PLATE SEAL

(75) Inventors: Gary C. Liotta, Simpsonville, SC (US); John D. Ward, Jr., Woodruff, SC (US)

(73) Assignee: General Electric Company, Schenectady, NY (US)

( * ) Notice: Subject to any disclaimer, the term of this patent is extended or adjusted under 35 U.S.C. 154(b) by 1181 days.

(21) Appl. No.: 11/879,928

(22) Filed: Jul. 19, 2007

(65) Prior Publication Data
US 2009/0022592 A1 Jan. 22, 2009

(51) Int. Cl.
*F01D 5/30* (2006.01)
*F01D 5/32* (2006.01)

(52) U.S. Cl.
USPC .................................. 416/221; 416/220 R

(58) Field of Classification Search .............. 416/219 R, 416/220 R, 221, 248
See application file for complete search history.

(56) References Cited

U.S. PATENT DOCUMENTS

| | | | |
|---|---|---|---|
| 2,753,149 A * | 7/1956 | Kurti ............................ 416/216 |
| 2,801,074 A | 7/1957 | Brown | |
| 3,076,634 A | 2/1963 | Boyle et al. | |
| 3,768,924 A | 10/1973 | Corsmeier et al. | |
| 3,814,539 A | 6/1974 | Klompas | |
| 4,102,602 A * | 7/1978 | Rottenkolber ................ 416/221 |
| 4,505,640 A * | 3/1985 | Hsing et al. .................. 416/97 R |
| 4,531,889 A * | 7/1985 | Grondahl ..................... 416/96 R |
| 4,778,342 A * | 10/1988 | Conlow ..................... 416/220 R |
| 5,211,407 A | 5/1993 | Glynn et al. | |
| 5,257,909 A | 11/1993 | Glynn et al. | |
| 5,318,404 A * | 6/1994 | Carreno et al. ............. 416/96 R |
| 6,190,131 B1 | 2/2001 | Deallenbach | |
| 6,416,286 B1 | 7/2002 | Roberts et al. | |
| 6,837,686 B2 * | 1/2005 | Di Paola et al. .......... 416/220 R |
| 7,192,245 B2 * | 3/2007 | Djeridane et al. ............ 415/115 |

* cited by examiner

*Primary Examiner* — Edward Look
*Assistant Examiner* — Sean J Younger
(74) *Attorney, Agent, or Firm* — James W. Pemrick; Ernest G. Cusick; Frank A. Landgraff

(57) ABSTRACT

A seal for a dovetail joint in a turbomachine is provided. The seal includes an arcuate member having a first end, a middle portion and a second end. The seal also includes sealing means, which include at least one sealing member. The sealing member can comprise a first sealing member connected to the first end and/or a second sealing member connected to the second end. The dovetail joint is the interface between a bucket dovetail and a rotor dovetail groove, and the seal reduces the amount of cooling flow leakage from the dovetail joint.

8 Claims, 4 Drawing Sheets

CLAMPED PLATE SEAL

BACKGROUND OF THE INVENTION

This application relates to turbomachinery and, in particular, to a sealing device to seal the junction between a dovetail slot and the dovetail base of a blade, bucket, or airfoil in a turbine or compressor.

In turbomachinery, such as a gas turbine, air is pressurized in a compressor and mixed with fuel in a combustor for generating hot combustion gases. Subsequent turbine stages extract energy from the combustion gases for powering the compressor and producing useful work (e.g., rotating the rotor or field of a generator).

A turbine can follow the combustor and may include one or more rows of turbine rotor blades that extract energy from the gases for powering the compressor. The turbine can power an external drive shaft that may be used for powering an electrical generator in a typical industrial gas turbine engine application.

Since the rotor blades of the turbine are subject to the hottest temperatures of the combustion gases and rotate at high speed they are subject to considerable thermal and centrifugal stresses during operation. In order to improve their life and durability, the turbine blades are typically formed of superalloys, such as nickel-based metal, for their enhanced strength at elevated temperatures.

The turbine blades or buckets typically include hollow airfoils having cooling channels therein through which is circulated cooling air bled from the compressor during operation. The blades also include an integral platform which defines the inner boundary for the hot combustion gases, with an integral supporting dovetail being disposed therebelow. The blade dovetails are mounted in corresponding dovetail slots in the perimeter of the supporting turbine rotor disk or wheel. Axial-entry dovetails are common and extend through axial dovetail slots disposed around the perimeter of the rotor disk or wheel.

Cooling air for the cooled turbine buckets can be fed from the bottom of the turbine bucket dovetail and then passes radially into the bucket. The cooling air first passes through the gap between the bottom of the turbine bucket dovetail and the rotor dovetail groove. The fit between the bucket dovetail and the rotor dovetail groove is not completely tight, and a gap exists between the respective parts. Generally, a large gap exists between the bottom of the bucket dovetail and the bottom of the rotor wheel dovetail groove. Additionally, gaps can exists between the sidewalls of the dovetail groove and the sides of the bucket dovetail. These gaps allow cooling air to escape and result in reduced engine or turbine performance.

Various coatings, such as Aluminide, have been applied to the bucket dovetail to try and reduce the size of the gap, but the gap is too large for any coatings to be completely effective or durable. Typically, a 360 degree ring is pressed against the forward and aft sides of the dovetail faces for sealing purposes. The problem with these rings is that they cannot be easily disassembled and replaced in the field. The 360 degree rings can be disassembled only when the entire rotor is disassembled. Also, when one part of the ring fails, the whole ring must be replaced. Therefore, the 360 degree ring option, is not the most desirable solution.

Accordingly, a need exists in the art for a device that can be used to effectively seal the dovetails in a turbomachine, is easy to install, and easily and quickly replaced in the field.

BRIEF DESCRIPTION OF THE INVENTION

A seal for reducing cooling flow leakage in a dovetail joint of a turbomachine is provided, in one aspect of the invention. The turbomachine comprises a rotor wheel and a plurality of buckets. Buckets may also be referred to as blades or airfoils. A rotor wheel has a plurality of rotor dovetail slots, and these slots are circumferentially arranged around the outer perimeter of the rotor wheel. The rotor dovetail slots extend from a forward axial surface of the rotor wheel to an aft axial surface of the rotor wheel. Buckets include bucket dovetails, and the bucket dovetails are arranged to mate with the rotor dovetail slots. A dovetail joint is formed at the interface between the bucket dovetails and the rotor dovetail slots, and the dovetail joint is located proximate to the forward axial surface and aft axial surface of the rotor wheel. The seal comprises an arcuate beam member that extends through a bottom portion of at least one of the rotor dovetail slots. The arcuate beam member has a forward end, an aft end and a middle portion. The forward end is disposed near the forward axial surface of the rotor wheel, and the aft end is disposed near the aft axial surface of the rotor wheel. Sealing members comprise a forward sealing member and an aft sealing member. The arcuate beam member is coupled to both the forward and aft sealing members. The sealing members in cooperation with the arcuate beam member function to reduce cooling flow leakage in the dovetail joint.

A seal for a dovetail joint in a turbomachine is provided, in another aspect of the invention. The seal includes an arcuate member having a first end, a middle portion and a second end. The seal also includes sealing means, which include at least one sealing member. The sealing member can comprise a first sealing member connected to the first end and/or a second sealing member connected to the second end. The dovetail joint is the interface between a bucket dovetail and a rotor dovetail groove, and the seal reduces the amount of cooling flow leakage from the dovetail joint.

DETAILED DESCRIPTION OF THE INVENTION

Figure 1:
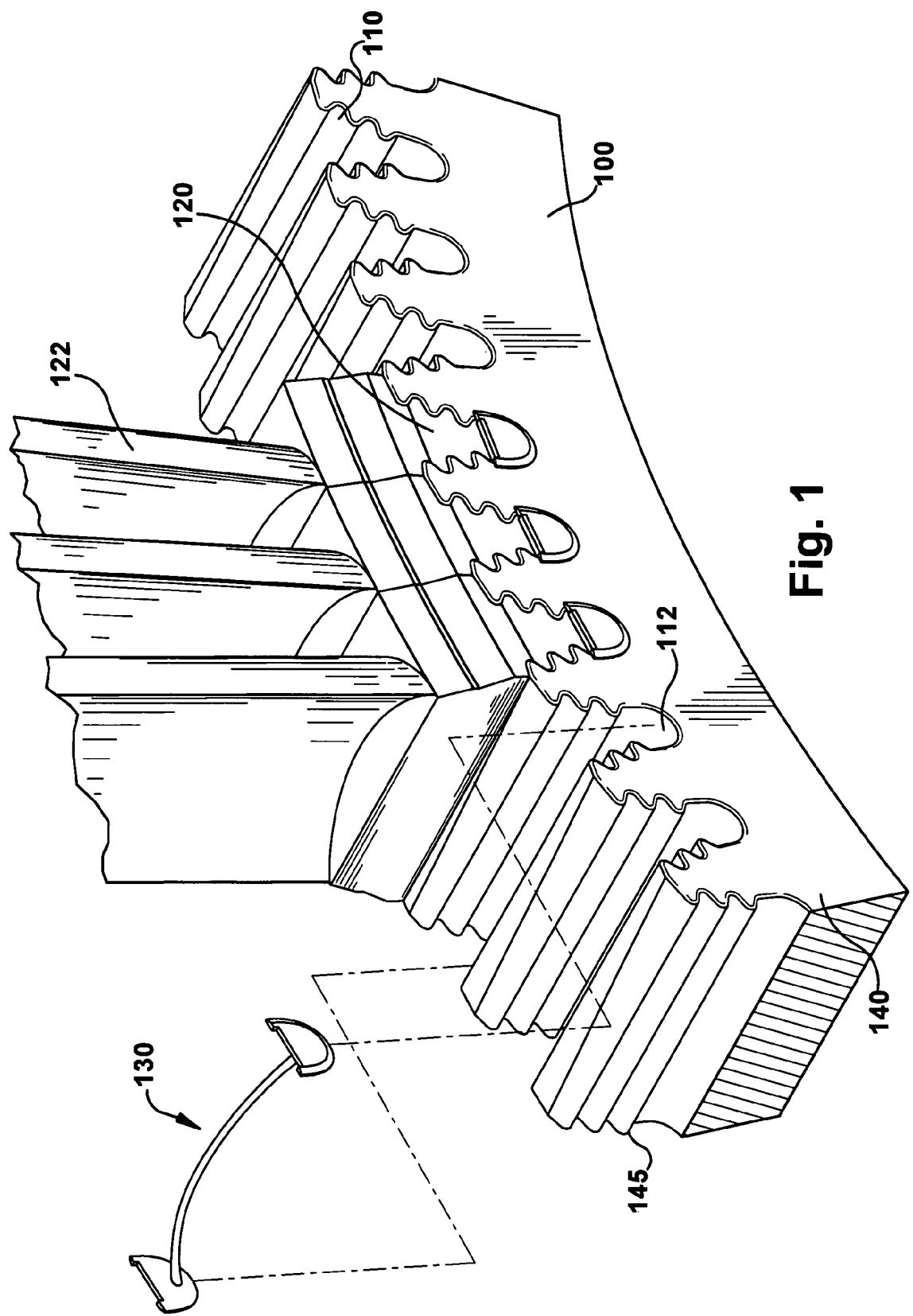
FIG. 1 is a fragmentary, perspective illustration of the buckets, rotor wheel, the clamped plate seal and rotor dovetail slots, according to one embodiment of the present invention.

Referring to FIG. 1, a portion of a turbine rotor wheel 100 having female rotor dovetails 110 is shown. The rotor dovetails 110 may be spaced at even intervals around the entire circumference of the rotor wheel 100. The rotor dovetails 110 extend in a generally axial direction, which may be parallel to the axis of the rotor wheel 100. Rotor dovetails may be of three general types, axial entry, angled entry and curved entry. However, other entry types are within the scope of the invention. Axial entry dovetails, as previously described, have their axis arranged to be generally parallel with the axis of the rotor wheel. Angled entry dovetails have their axis arranged non-parallel or at an angle to the axis of the rotor wheel. Curved entry dovetails have a non-linear and curved axis. Assuming the rotor wheel axis is the X-direction and the radial direction of the rotor wheel is the Y-direction, curved entry dovetails may be curved with respect to one or both of the X and Y directions.

The rotor dovetails 110 receive mating male bucket dovetails 120 formed on the radial inner ends of the buckets 122. Buckets 122 may also be referred to as blades or airfoils. Only a portion of the bucket airfoils are shown in FIG. 1. In the construction process of the complete turbine rotor wheel, the bucket dovetails 120 on the inner radial ends of the buckets 122 slide axially into the mating rotor dovetails 110 on the rotor wheel 100. This exemplary arrangement of buckets 122 and rotor 100 could be used in the turbine or compressor of a turbomachine.

A clamped plate seal 130, according to one embodiment of the present invention, seals the individual bucket dovetail 120 to rotor dovetail 110 interface. The clamped plate seal 130 is inserted into the bottom groove 112 of the rotor dovetail 110. There may be one clamped plate seal 130 per bucket.

Figure 2:
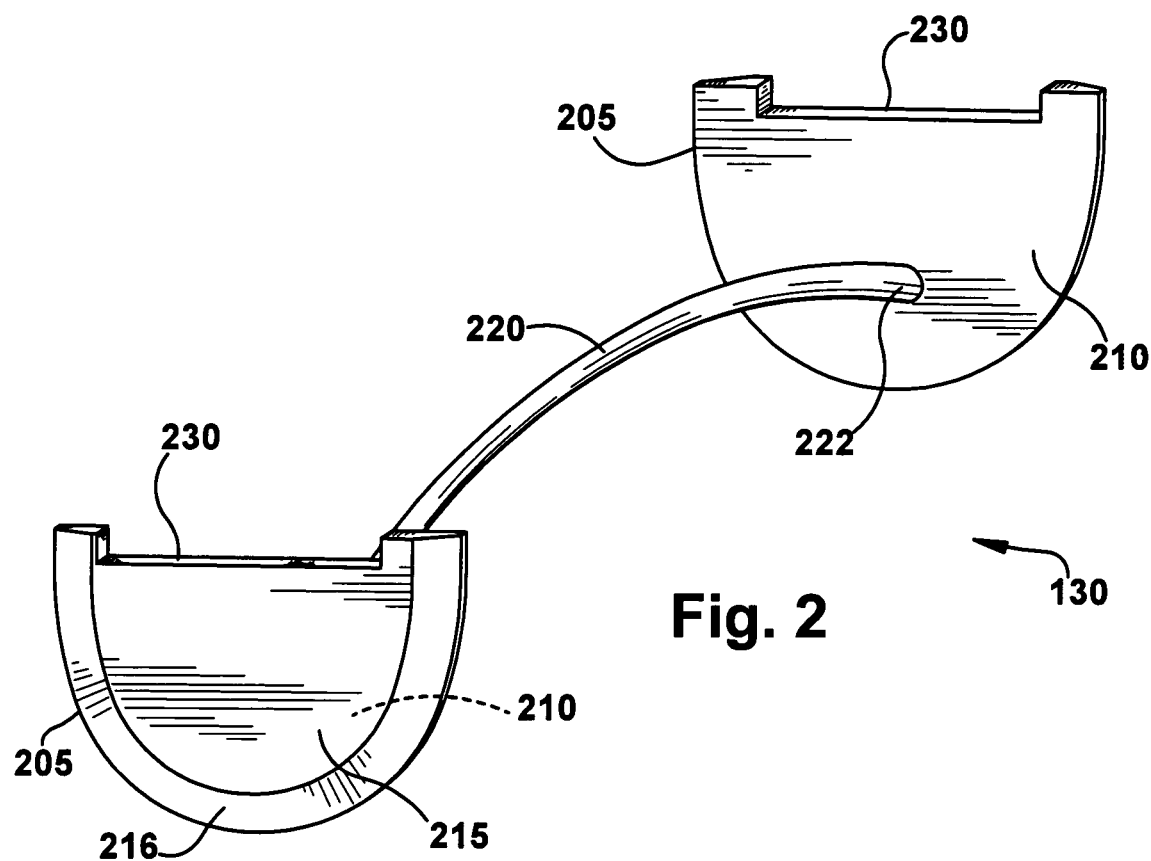
FIG. 2 is a perspective illustration of the clamped plate seal, according to one embodiment of the present invention.

Referring to FIG. 2, the clamped plate seal 130, which may be an integral or unitary design, is comprised of two sealing members 205 having opposed sealing faces 210 which are connected together via an arched or arcuate beam 220. The sealing faces 210 face towards and press against both the forward 140 and aft 145 dovetail faces of the rotor wheel 100. The sealing faces 210 can be viewed as axial sealing means, in that they press on axial surfaces of the rotor wheel 100 and axial portions of the bucket dovetail 120. Any cooling leakage flow traveling in an axial direction through the dovetail joint, will be greatly limited, if not stopped, by the axial sealing faces 210. Two sealing members 205 are illustrated in FIG. 2, but only one sealing member could be used in alternative embodiments. In one sealing member embodiments, either the forward or aft dovetail face surface could be sealed.

The sealing members 205 also comprise outer surfaces 215 which can also include tapered portions 216. The outer surfaces 215 face away from the dovetail joint and are generally parallel to the axial sealing faces 210. However, outer surface 215 could be flat, domed or other shapes as well. The tapered portions 216 are oriented non-parallel to the axial sealing faces 210. This angle or taper helps to reduce windage losses while the rotor wheel 100 rotates during operation of the turbomachine. The angle between the face of the tapered portion 216 and the face of axial sealing portions 210 may be between 1 to 75 degrees. In one embodiment of the invention, tapered portions 216 are smooth, but they may also be dimpled, concave, convex, have compound shapes or have other surface configurations that may help to further reduce windage losses.

When installed in the bottom groove 112, the arched beam 220 provides tension and pulls the sealing faces 210 toward each other. The sealing faces 210 form axial sealing surfaces, and function to limit any axial cooling leakage flow from the bottom groove 112 and lower portions of the dovetail. As the turbine is operated the rotor wheel 100 and buckets 122 rotate at high speed. Centrifugal force acts on the arched beam 220 and forces the middle portion of the beam 220 in a radially outward direction. As the beam is forced out radially, the ends of the beam 222 are pulled axially inward. This axial pull creates a clamping and sealing action on sealing faces 210.

In addition to the axial sealing faces 210, the clamped plate seal also includes radial sealing surfaces 230. The radial sealing surfaces 230 may contact tabs 410 (see FIG. 4) or projections on one or both sides of the base of the bucket dovetail 120. The radial sealing surfaces 230 support the entire dynamic weight of the seal 130 and provide a positive radial seal. Centrifugal force also helps to maintain this radial seal. In other embodiments of the invention, the projections or tabs may be eliminated and replaced with any suitable radial surface capable of supporting the clamped plate seal in a radial direction. For example, the sealing face 210 may include a notch, ledge, rectangular groove or rabbet that engages a portion of the rotor wheel or bucket dovetail.

In one embodiment of the invention, the radial sealing surfaces 230 have tabs that engage slots on one or both sides of the bucket dovetail 120. The slots may also be located on the outer 215 or inner 210 surface of the sealing member 205 with the tabs extending from the bucket dovetail. The slots and tabs position the sealing surfaces 205 axially and help to prevent them from disengaging from the rotor. The tabs and slots can also position and hold the bucket dovetail 120 in place axially with respect to the rotor wheel 100.

In still additional aspects of the present invention, one or both of the axial sealing faces 210 may include a groove or rabbet that does not fully extend to the opposite outer surface 215. In these embodiments, the bucket dovetail projection may engage the groove or rabbet, but the projection does not extend to or past outer surface 215. The sealing members 205 may also include angel wings or other projections. Angel wings can be used as seals and are axial extensions of the turbine rotor blade (i.e., a bucket), a bucket dovetail or sealing member. A seal is formed by the angel wing overlapping with nozzle seal lands. The nozzle seal lands may form part of the fixed component of a gas turbine. The angel wing seals inhibit ingestion of hot gases from the flowpath into gas turbine wheel spaces. Angel wing seals can be cast integrally as part of the blade, bucket dovetail, or sealing members, as embodied by the present invention.

Arched beam 220 is curved radially outward. The center or middle of the beam is disposed more radially outward than the ends of the beam. This curved shape has many advantages over a straight beam shape. The stresses experienced by the arched beam 220 are distributed fairly evenly across the entire length of the beam. The curved shape also provides for flexibility from variations in thermal expansion between the clamped plate seal 130 and the rotor wheel 100. This flexibility also aids in accepting or accommodating manufacturing variations due to part tolerances, or arched beans 220 of slightly different lengths. Rotors 100 of slightly different thicknesses, in the axial direction, can easily be accommodated by the clamped plate seal 130.

The arched beam may be cast from a die or formed from any other suitable manufacturing process, or can be made from multiple pieces that are joined together. The material used for constructing the arched beam and sealing faces can be any material that can withstand the temperatures typically occurring in a turbomachine, such as a gas turbine. For example, nickel or steel alloys, IN625, IN738 or IN718 are but a few examples of suitable materials that can be used for the clamped plate seal 130.

Figure 3:
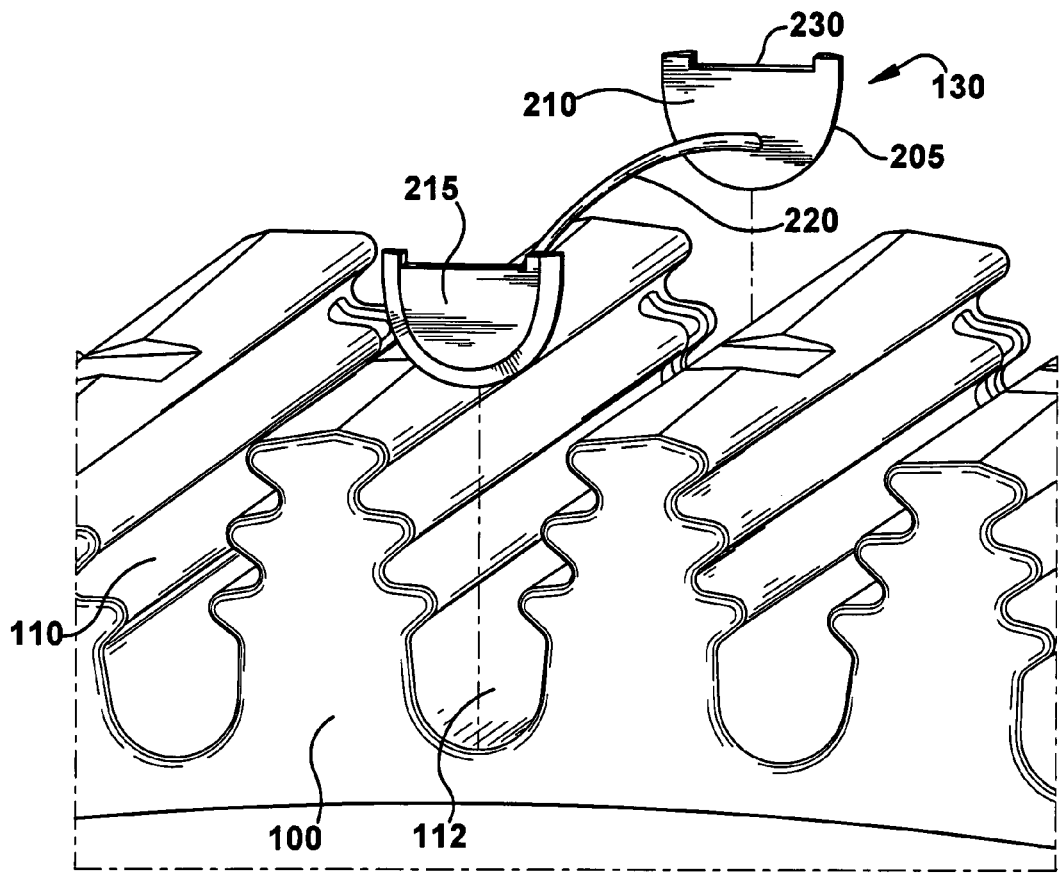
FIG. 3 is a fragmentary, perspective view of the rotor dovetail slots and the clamped plate seal, with the clamped plate seal shown positioned above a rotor dovetail slot, according to one embodiment of the present invention.

A method of installing the clamped plate seal 130, according to one embodiment of the invention, will now be described with reference to FIGS. 3-5. FIG. 3 illustrates an empty rotor dovetail 110 prior to insertion of the clamped plate seal 130 and bucket dovetail 120. Seal 130 can be seen above rotor dovetail 110, and is placed in the bottom of rotor dovetail 112.

Figure 4:
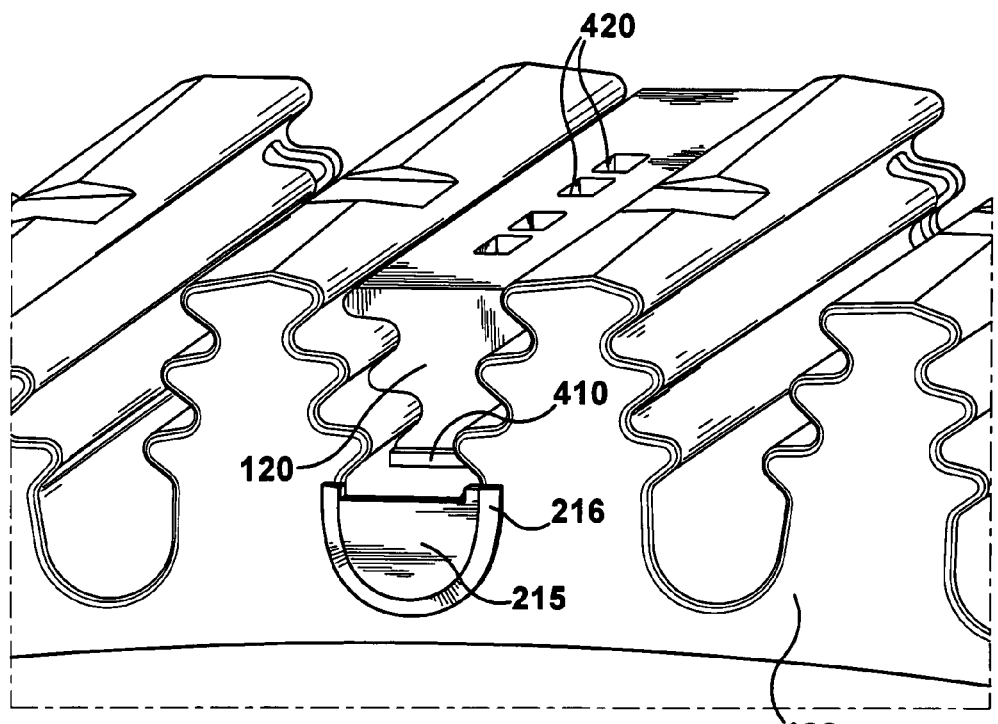
FIG. 4 is a fragmentary, perspective view of the rotor dovetail slots and a bucket dovetail, with the clamped plate seal shown positioned in the bottom of one of the rotor dovetail slots, and a bucket dovetail shown partially inserted into one of the rotor dovetail slots, according to one embodiment of the present invention.

FIG. 4 illustrates seal 130 in the bottom 112 of rotor dovetail 110, and bucket dovetail 120 partially inserted in rotor dovetail 110. For clarity, only a portion of the bucket dovetail 120 is shown in FIGS. 4-6. Bucket dovetail 120 can be slid in an axial direction into dovetail 110 from either the forward or aft side of rotor wheel 100. A projection 410 may be present on the lower portion of the bucket dovetail 120. This projection extends out from the main surface of the end wall of the dovetail 120. Bucket dovetail 120 may have a projection 410 on one or both sides, that is, the forward and aft sides of the dovetail 120. The projection 410 can be used to radially support the seal 130. The weight of the seal 130, during operation of the turbomachine and rotation of rotor wheel 100, is supported by this projection 410. Radial sealing surface 230 makes contact with the projection 410 and also functions to seal any leakage flow from the interface between radial sealing surface 230 and projection 410. In alternative embodiments, the projection 410 may be omitted. For example, the sealing members 205 may include notches, ledges, rabbets, or rectangular grooves that can be used to support the clamped plate seal in a radial direction by interfacing with surfaces on the dovetail or rotor wheel.

The cooling channels 420 can be seen in this partial illustration of the bucket dovetail 120. Only a few cooling channels 420 are illustrated for clarity, and it is to be understood that more or fewer cooling channels may be present in the bucket dovetail and bucket airfoil. The cooling channels extend from the base, or most radially inward portion, of the bucket dovetail 120 and extend into and through the bucket airfoil (not shown in FIG. 4). Cooling air or steam may be passed through these channels to cool the bucket. In one example, the cooling air may be bled off from the compressor.

Figure 5:
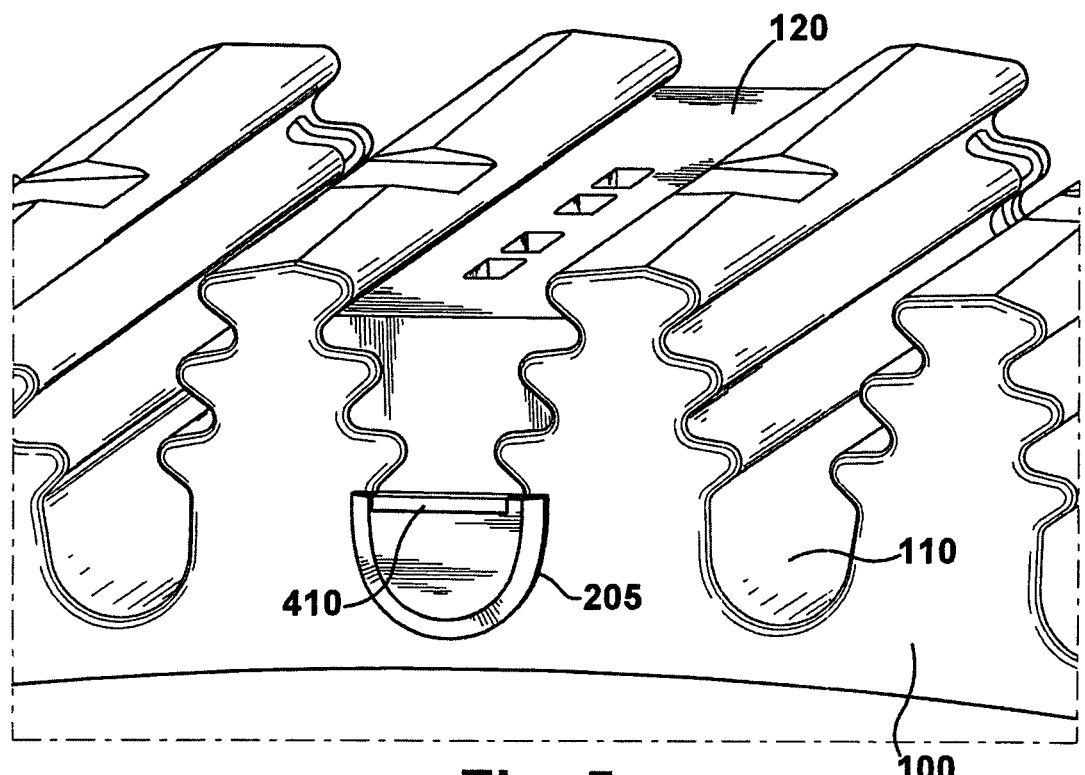
FIG. 5 is a fragmentary, perspective view of the rotor dovetail slots and a bucket dovetail, with the clamped plate seal shown positioned in the bottom of one of the rotor dovetail slots, and a bucket dovetail shown fully inserted into one of the rotor dovetail slots, according to one embodiment of the present invention.
Figure 6:
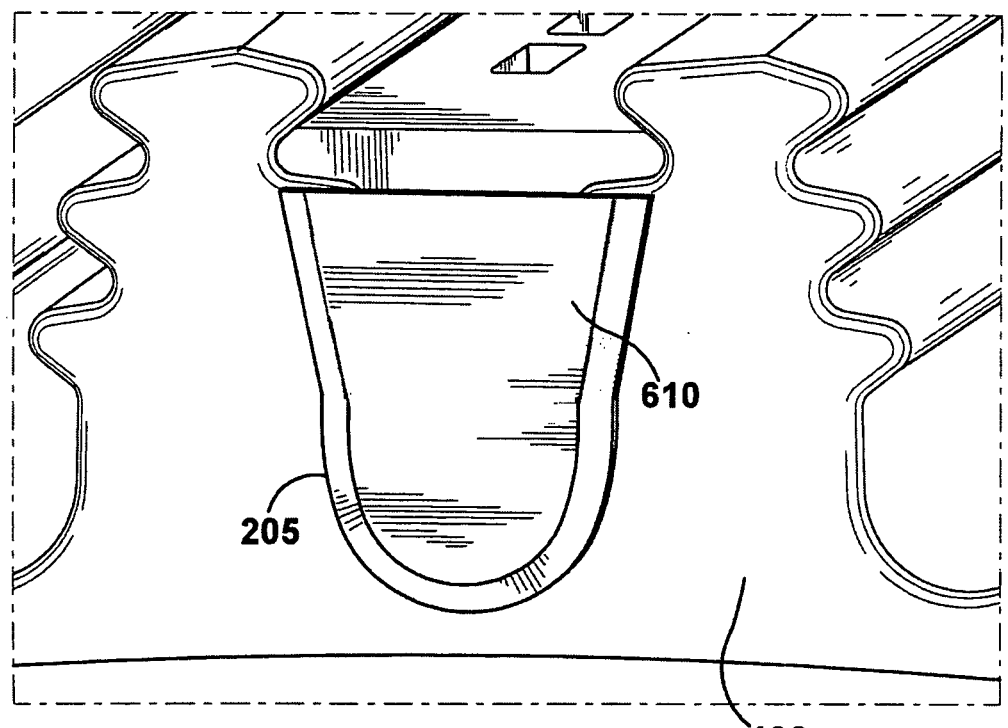
FIG. 6 is an enlarged fragmentary, perspective view of the rotor dovetail slots and a bucket dovetail, with another embodiment of the clamped plate seal having increased coverage area shown positioned in the bottom of one of the rotor dovetail slots, according to one embodiment of the present invention.

FIG. 5 illustrates the bucket dovetail 120 fully inserted in one of the rotor dovetail grooves 110. The outer axial surfaces of both the bucket dovetail 120 and the rotor wheel 100 may be approximately flush with each other, and the projection 410 extends outwardly from these surfaces. In some embodiments, the outer axial surface of the projection 410 and the outer surface 215 of the sealing member 205 may be flush with each other as well. As can be seen from FIGS. 1-5, the seal 130 is very effective in minimizing cooling air leakage through the dovetail joint.

FIG. 6 illustrates another embodiment of the present invention. One or both of the sealing members 205 can be augmented by adding an extended radial sealing member 610. The extended radial sealing member 610 provides further sealing around the dovetail joint and can reduce cooling leakage flow through upper portions of the dovetail joint. The extended radial sealing member may be formed integrally with sealing member 205, to form a unitary element. In one embodiment of the present invention, a projection 410 passes into but not through the sealing member 205.

In additional aspects of the present invention, the area where the arched or arcuate beam member 220 makes contact with sealing members 205 may be curved or tapered to reduce loads and stresses. The diameter of the arched beam 220, may be flared to dissipate local stresses. This "flaring" distributes the stresses on the beam more uniformly and may eliminate high point stress loads near the point of contact between the sealing members 205 and the arched beam 220.

The arched beam can take other shapes and forms than previously described. For axial dovetails the arched beam can be formed generally perpendicular to the radial sealing faces of the clamped plate seal. Angled or skewed dovetails may have the arched beam oriented in a non-perpendicular fashion. Curved dovetails may use arched beams having a compound curved shape. The compound curved shape of the arched beam may be curved in both an axial direction e.g., X-direction) and a radial direction (e.g., Y-direction).

In still further aspects of the present invention, the arcuate beam member may take the form of a spring, telescoping member or any other suitable means to connect the sealing members. As described previously, instead of two sealing members, only one may be used, with any appropriate means employed to properly secure the other end of the clamped plate seal.

The clamped plate seal, according to the various embodiments of the present invention, can be used in any rotating turbomachine where a need exists for limiting leakage flow. A turbomachine can be an engine in which the kinetic energy of a moving fluid is converted into mechanical energy by causing a bladed rotor to rotate. Turbomachines can comprise, turbines (operated by various and diverse fuels), gas turbines, steam turbines, water or hydro turbines, bio-fuel turbines, turbine engines used to power aircraft or marine engines.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A seal comprising:
   an arched beam configured to extend through a bottom portion of a rotor dovetail, the arched beam having a forward end, an aft end and a middle portion, the forward end configured to be disposed near a forward axial surface of a rotor wheel, and the aft end configured to be disposed near an aft axial surface of the rotor wheel;
   sealing members comprising a forward sealing member and an aft sealing member, the arched beam coupled to both the forward sealing member and the aft sealing member, the sealing members including radial sealing surfaces configured to contact a projection on a bucket dovetail, and wherein at least one of the sealing members is disposed to cover substantially a majority of an axial surface of a dovetail joint formed between the rotor dovetail and a bucket dovetail; and
   wherein, the arched beam is configured to apply tension to the sealing members, and the seal is configured to reduce flow leakage into and out of the rotor dovetail in the rotor wheel.

2. The seal of claim 1, the sealing members further comprising:
   a tapered portion for reducing windage losses during operation of a turbomachine comprising the seal.

3. The seal of claim 1, wherein the arched beam is configured to be curved radially outward so that a center of the arched beam is disposed more radially outward than ends of the arched beam.

4. The seal of claim 3, wherein the seal is configured for use with the turbomachine and the turbomachine is selected from one of the group comprising:
   a gas turbine, a steam turbine, and an aircraft engine.

5. A seal for a dovetail joint in a turbomachine, the seal comprising:
   an arched beam configured to extend through a bottom portion of a rotor dovetail, the arched beam having a forward end, an aft end and a middle portion, the forward end configured to be disposed near a forward axial surface of a rotor wheel, and the aft end configured to be disposed near an aft axial surface of the rotor wheel;

sealing members comprising a forward sealing member and an aft sealing member, the arched beam coupled to both the forward sealing member and the aft sealing member, the sealing members including radial sealing surfaces configured to contact a projection on a bucket dovetail, wherein at least one of the sealing members is disposed to cover substantially a majority of an axial surface of a dovetail joint formed between the rotor dovetail and a bucket dovetail; and wherein, the arched beam is configured to apply tension to the sealing members, and the seal is configured to reduce flow leakage into and out of the rotor dovetail in the rotor wheel.

6. The seal of claim 5, the sealing members further comprising:

a tapered portion for reducing windage losses during operation of a turbomachine comprising the seal.

7. The seal of claim 6, wherein the arched beam is configured to be curved radially outward so that a center of the arched beam is disposed more radially outward than ends of the arched beam.

8. The seal of claim 7, wherein the seal is configured for use with the turbomachine and the turbomachine is selected from one of the group comprising:

a gas turbine, a steam turbine, and an aircraft engine.

\* \* \* \* \*